US007966871B2

(12) United States Patent
Perryman et al.

(10) Patent No.: US 7,966,871 B2
(45) Date of Patent: Jun. 28, 2011

(54) DETECTION OF FAULTS IN AN INJECTOR ARRANGEMENT

(75) Inventors: Louisa J. Perryman, Rainham (GB); Daniel Jeremy Hopley, Chislehurst (GB)

(73) Assignee: Delphi Technologies Holding S.arl, Troy, MI (US)

( * ) Notice: Subject to any disclaimer, the term of this patent is extended or adjusted under 35 U.S.C. 154(b) by 141 days.

(21) Appl. No.: 12/427,089

(22) Filed: Apr. 21, 2009

(65) Prior Publication Data

US 2009/0314073 A1 Dec. 24, 2009

(30) Foreign Application Priority Data

Apr. 30, 2008 (GB) .................................. 0807854.5

(51) Int. Cl.
*G01M 15/04* (2006.01)

(52) U.S. Cl. .................................................... 73/114.45

(58) Field of Classification Search ................ 73/114.45
See application file for complete search history.

(56) References Cited

U.S. PATENT DOCUMENTS 6,366,868 B2* 4/2002 Freudenberg et al. ........ 702/115
6,820,474 B2* 11/2004 Mrosik et al. .............. 73/114.51
7,034,437 B2* 4/2006 Fukagawa et al. ....... 310/316.03
7,273,039 B2* 9/2007 Ohno et al. .................. 123/479
7,497,204 B2* 3/2009 Perryman et al. ............. 123/479
7,624,721 B2* 12/2009 Perryman et al. ............. 123/479
7,640,918 B2* 1/2010 Perryman et al. ............. 123/479
7,822,537 B2* 10/2010 Perryman et al. ............. 701/114
2001/0039484 A1* 11/2001 Freudenberg et al. ........ 702/115
2002/0041475 A1* 4/2002 Rueger et al. ................ 361/91.1
2004/0008032 A1* 1/2004 Rueger et al. ................. 324/522
2007/0227506 A1* 10/2007 Perryman et al. ............. 123/479
2008/0006246 A1* 1/2008 Perryman et al. ............. 123/480
2008/0129305 A1 6/2008 Perryman et al.
2008/0319699 A1 12/2008 Perryman
2009/0140747 A1* 6/2009 Perryman et al. ............. 324/537

FOREIGN PATENT DOCUMENTS

JP 2002-21676 1/2002
JP 2003-299371 10/2003

OTHER PUBLICATIONS

Japan Office Action dated Dec. 10, 2010.

* cited by examiner

*Primary Examiner* — Freddie Kirkland, III
(74) *Attorney, Agent, or Firm* — Thomas N. Twomey

(57) ABSTRACT

A method of identifying an individual short circuit fuel injector, within an injector bank of an engine comprising a plurality of fuel injectors. Each fuel injector has a piezoelectric actuator and an associated injector select switch forming part of an injector drive circuit. The method comprises: (i) charging all of the piezoelectric actuators of the plurality of fuel injectors within the injector bank during a charge phase; (ii) at the end of the charge phase waiting for a delay period; and (iii) subsequently closing an injector select switch of a fuel injector to select said fuel injector. The method further comprises: (iv) determining a stack voltage present on terminals of the piezoelectric actuator of the selected fuel injector and storing the stack voltage in a data store. The stack voltage is indicative of an amount of charge present on the selected injector at the end of the delay period. The method further comprises (v) repeating steps (i) to (iv) for each fuel injector in the injector bank in turn; and (vi) identifying the individual short circuit fuel injector as being the injector which has discharged beyond a predetermined voltage drop limit during the delay period. The method also comprises generating a short circuit fault signal for the identified fuel injector.

13 Claims, 9 Drawing Sheets

DETECTION OF FAULTS IN AN INJECTOR ARRANGEMENT

TECHNICAL FIELD

The present invention relates to a method and apparatus for detecting faults in a fuel injector arrangement, and particularly to a method and apparatus for detecting short circuit faults in piezoelectric fuel injectors.

BACKGROUND TO THE INVENTION

In a direct injection internal combustion engine, a fuel injector is provided to deliver a charge of fuel to a combustion chamber prior to ignition. Typically, the fuel injector is mounted in a cylinder head with respect to the combustion chamber such that its tip protrudes slightly into the chamber in order to deliver a charge of fuel into the chamber.

One type of fuel injector that is particularly suited for use in a direct injection engine is a so-called piezoelectric injector. A piezoelectric injector 12 and its associated control system 24 are shown schematically in FIG. 1.

The piezoelectric injector 12 includes a piezoelectric actuator 16 that is operable to control the position of an injector valve needle 17 relative to a valve needle seat 18. The piezoelectric actuator 16 includes a stack 19 of piezoelectric elements, having the electrical characteristics of a capacitor. The stack 19 may be charged or discharged by application of a differential voltage to positive and negative terminals of the actuator 16, which causes the stack of piezoelectric elements to expand or contract. The expansion and contraction of the piezoelectric elements is used to vary the axial position, or 'lift', of the valve needle 17 relative to the valve needle seat 18.

The piezoelectric injector 12 is controlled by an injector control unit 22 (ICU) that forms an integral part of an engine control unit 24 (ECU). The ICU 22 typically comprises a microprocessor 26 and memory 28. The ECU 24 also comprises an injector drive circuit 30, to which the piezoelectric injector 12 is connected by way of first and second power supply leads 31, 32.

Typically, fuel injectors are grouped together in banks of one or more injectors, and each bank of injectors is selectably connected to the drive circuit 30 for controlling operation of the injectors.

In a so-called 'discharge to inject' injector, in order to initiate an injection event the injector drive circuit 30 causes the differential voltage applied to the injector 12 to transition from a high voltage (typically 200V) at which no fuel delivery occurs, to a relatively low voltage (typically −55V), which causes the valve needle 17 to lift away from the valve needle seat 18.

Like any circuit, faults may occur in a drive circuit. In safety critical systems, such as diesel engine fuel injection systems, a fault in the drive circuit may lead to a failure of the injection system, which could consequentially result in a catastrophic failure of the engine. Diagnostic systems for detecting short circuit faults in piezoelectric actuators of piezoelectric injectors are disclosed in applicant's co-pending patent applications EP 1843027, EP 1860306, EP 06256140.2, and EP 07252534.8, EP 07254036.2 the contents of each document being incorporated herein by reference.

Five main types of short circuit fault exist:

i) a short circuit between the terminals of a piezoelectric actuator; otherwise referred to as a 'stack terminal' short circuit;

ii) a short circuit from the positive terminal of a piezoelectric actuator to a ground potential; the positive terminal is also referred to as the 'high' terminal, and this type of short circuit is generally referred to as a 'high side to ground' short circuit;

iii) a short circuit from the negative terminal of a piezoelectric actuator to a ground potential; the negative terminal is also referred to as the 'low' terminal, and this type of short circuit is generally referred to as a 'low side to ground' short circuit;

iv) a short circuit from the positive terminal of a piezoelectric actuator to a non-ground or 'battery' potential; this type of short circuit is generally referred to as a 'high side to battery' short circuit; and v) a short circuit from the negative terminal of a piezoelectric actuator to a non-ground or 'battery' potential; this type of short circuit is generally referred to as a 'low side to battery' short circuit.

It is to be appreciated that a non-ground or battery potential refers to a voltage potential which is not ground, i.e. zero volts. Typically, this may be any low voltage derivable from the voltage supply or battery. These types of short circuit are referred to as high side or low side 'to battery' for simplicity. However, it does not exclusively refer to direct shorts to the battery terminal or potential.

Different techniques and methods are employed in the above-referenced co-pending patent applications in order to identify faulty injector banks. However, it has previously not been possible to identify individual faulty injectors 12 that are short circuited, because of the risk of 'charge sharing' between faulty and non-faulty injectors. Charge sharing occurs when a non-faulty injector 12*a*, 12*b* is selected causing it to discharge into a faulty injector 12*a*, 12*b*, and has previously prevented diagnostic techniques from being able to determine which of the individual injectors 12*a*, 12*b* are faulty.

An other problem associated with charge sharing is the risk that an uncontrolled injection could occur. If a low resistance short circuit were to occur it is possible that the faulty injector could fully discharge in a very short period of time. In so-called 'discharge to inject' systems, this results in the injector valve needle 17 lifting relative to the valve needle seat 18, and this could result in an increased volume of fuel and an uncontrolled injection. This could potentially cause damage to the engine if too much fuel is injected. In addition, the actuators could be damaged if uncontrolled currents are permitted to flow following a stack terminal short circuit.

Even if the short circuit is of a sufficiently high resistance to not cause engine or actuator damage, the performance of the engine may be adversely affected if a short circuit were to go undetected, and may result in undesired levels of fuel delivery and emissions.

Since it has not been possible to identify individual faulty injectors, the recovery action on detection of the fault is to shut down the entire injector bank. It is then necessary to carry out time-consuming tests during engine servicing to identify the faulty injector. These tests may not be conclusive and in some cases non-faulty parts may be replaced unnecessarily.

An aim of the invention is therefore to provide a diagnostic tool that is capable of detecting individual injectors which are short circuited and a method of operating the diagnostic tool.

SUMMARY OF INVENTION

According to a first aspect of the invention, there is provided a method of identifying an individual short circuited fuel injector, within an injector bank of an engine comprising a plurality of fuel injectors each having a piezoelectric actuator and an associated injector select switch forming part of an injector drive circuit, and the method comprising: (i) charging all of the piezoelectric actuators within the injector bank during a charge phase; (ii) at the end of the charge phase waiting for a delay period; (iii) subsequently closing an injector select switch of a fuel injector to select said fuel injector; (iv) determining a stack voltage present across the piezoelectric actuator of the selected fuel injector and storing the stack voltage in a data store, wherein the stack voltage is indicative of an amount of charge present on the selected injector at the end of the delay period; (v) repeating steps (i) to (iv) for each fuel injector in the injector bank in turn; (vi) identifying the individual short circuit fuel injector as being the injector which has discharged beyond a predetermined voltage drop limit during the delay period; and (vii) generating a short circuit fault signal for the identified fuel injector.

Advantageously, the above method provides away in which individual faulty injectors may be identified such that servicing of engines is made easier and quicker and so alleviates the problem of unnecessary replacement of non-faulty fuel injectors.

In one embodiment, the step of charging all of the piezoelectric actuators may comprise: applying a top rail voltage to a high voltage rail of the drive circuit; and closing a charge switch of the drive circuit during the charge phase such that the stack voltage of each piezoelectric actuator is caused to increase to a voltage at or approaching the top rail voltage. The top rail voltage and the delay period may be derived on the basis of a threshold short circuit resistance, so as to identify an individual short circuit injector which has a short circuit resistance equal to or less than the threshold short circuit resistance.

Preferably, the identifying step comprises identifying the individual short circuit fuel injector as being the injector with a stack voltage of substantially zero volts at the end of the delay period $T_D$.

In the case where the short circuit fuel injector has a stack terminal short circuit, the short circuit fault signal is a stack terminal short circuit fault signal associated with the identified fuel injector.

Optionally, the method further comprises closing a discharge switch of the drive circuit after the charging step; identifying the individual short circuit fuel injector as having a low side short circuit; and generating a low side short circuit fault signal for the identified fuel injector.

In one embodiment, the step of identifying the individual short circuit fuel injector may comprise determining whether the short circuit is a low side to ground short circuit, and the generated low side short circuit fault signal is a low side to ground short circuit fault signal.

In another embodiment, the step of identifying the individual short circuit fuel injector may comprise determining whether the short circuit is a low side to battery short circuit, and the generated low side short circuit fault signal is a low side to battery short circuit fault signal.

Advantageously, additional information concerning the type of fault and the individual faulty injector can be determined, which has previously been unknown in conventional diagnostic techniques.

Typically, the top rail voltage, the delay period, the threshold short circuit resistance, the predetermined voltage drop limit and the stack capacitance are derived from a look-up table.

Preferably, the top rail voltage, the threshold short circuit resistance and the delay period in the look-up table are calibrated on the basis of stack capacitance and stack temperature.

Optionally, the threshold short circuit resistance is dependent on the type of fault being identified, such that the threshold short circuit resistance may be configured depending on the type of fault to be detected.

The calibration of the top rail voltage, the delay period, the threshold short circuit resistance, and the predetermined voltage drop limit is important to ensure accurate results from these diagnostic techniques. Therefore, being able to calibrate these values according to the type of fault being detected, and also in relation to the other variables, ensures that the results obtained are robust.

Preferably, the method is executed during servicing of the engine.

According to a second aspect of the invention, there is provided an apparatus for identifying an individual short circuit fuel injector within an injector bank of an engine comprising a plurality of fuel injectors each having a piezoelectric actuator and an associated injector select switch forming part of an injector drive circuit, and the apparatus comprising: charge arrangement for charging the piezoelectric actuators; control arrangement arranged to cause the charge arrangement to connect to the piezoelectric actuators during a charge phase, and to close the injector select switches so as to select each of the injectors in turn at the end of a delay period following the charge phase; determining arrangement for determining from a voltage indicative of a stack voltage across a selected injector; the stack voltage being indicative of an amount of charge present on the selected injector at the end of the delay period; storing arrangement for storing the determined stack voltage in a data store; and identifying arrangement for identifying the short circuit injector as being the injector which has discharged beyond a predetermined voltage drop limit during the delay period, wherein the control arrangement is further arranged to generate a short circuit fault signal for the identified injector.

According to a third aspect of the invention, there is provided a method of identifying an individual short circuit fuel injector within an injector bank of an engine comprising a plurality of fuel injectors each having a piezoelectric actuator and an associated injector select switch, and the method comprising: (i) closing an associated injector select switch of a fuel injector to select said injector; (ii) determining whether a fault current flows through a current detection means in connection with the selected injector; repeating steps (i) and (ii) for each one of the plurality of fuel injectors by selecting their associated injector select switches; (iv) identifying the short circuit fuel injector as being the injector that causes a fault current to flow through the current detection means; and (v) generating a low side short circuit fault signal for the identified fuel injector.

Typically, the fault current is a current that flows as a result of a low side to ground or battery short circuit and exceeds a threshold current value which is dependent on the inherent resistance of the low side to ground short circuit.

In a preferred embodiment, the method comprises measuring the voltage at a bias point when no injector is selected, determining whether: a) the measured voltage is within a first set of limits which are indicative of the short circuit being a low side to ground short circuit; or b) the measured voltage is within a second set of limits which are indicative of the short circuit being a low side to battery short circuit; and wherein the step of generating a low side short circuit fault signal for the identified fuel injector comprises generating an appropriate low side to ground or battery short circuit fault signal.

Advantageously, additional information concerning the type of fault and the individual faulty injector can be determined, which has previously been unknown in conventional diagnostic techniques.

According to a fourth aspect of the invention, there is provided an apparatus for identifying an individual short circuit fuel injector, within an injector bank of an engine, the injector arrangement comprising a plurality of fuel injectors each having a piezoelectric actuator and an associated injector select switch forming part of an injector drive circuit, and the apparatus comprising: charge arrangement for charging the piezoelectric actuator; injector select means for selecting a piezoelectric actuator into the drive circuit; determining arrangement for determining whether a fault current flows through a current detection arrangement in connection with the selected injector; and control arrangement arranged to cause the charge means to connect to the piezoelectric actuators during a charge phase, wherein the control arrangement is further arranged to generate a low side short circuit fault signal for the injector that causes a fault current to flow through the current detection means.

According to a fifth aspect of the invention, there is provided a method of testing for the presence of high side to ground short circuits within an injector bank of an engine comprising a plurality of fuel injectors each having a piezoelectric actuator and an associated injector select switch forming part of an injector drive circuit, and the method comprising: monitoring the current through a current detecting resistor of the drive circuit; determining whether the monitored current exceeds a pre-determined current limit; and generating a high side short circuit fault signal for the injector bank if the monitored current exceeds the pre-determined current limit, or executing the method according to the first aspect of the invention if the monitored current does not exceed the pre-determined current limit.

Preferably, the above method further comprises closing an injector select switch prior to monitoring the current through the current detecting resistor, wherein the monitored current exceeding the pre-determined current limit is indicative of the high side short circuit fault.

In one embodiment, the method further comprises closing a regeneration switch prior to monitoring the current through the current detecting resistor, wherein the monitored current exceeding the pre-determined current limit is indicative of the high side short circuit fault.

In another embodiment, the method further comprises measuring the voltage at a bias point VB when no injector is selected; determining whether: a) the measured voltage is within a first set of limits which are indicative of the short circuit being a high side to ground short circuit; or b) the measured voltage is within a second set of limits which are indicative of the short circuit being a high side to battery short circuit; and wherein the step of generating a high side short circuit fault signal comprises generating an appropriate high side to ground or battery short circuit fault signal.

Advantageously, additional information concerning the type of fault and the individual faulty injector can be determined, which has previously been unknown in conventional diagnostic techniques.

According to a further aspect of the invention, there is provided a handheld device for use during servicing of an engine to provide visual indicators to an engineer using the device regarding information concerning the fault(s) identified. In particular, the further aspect of the invention comprises a handheld device comprising suitable hardware and software in order to implement any of the methods of the first, third or fifth aspects of the invention during servicing of an engine to provide visual indicators to an engineer using the device providing information concerning any faults identified.

Preferably, the information may include details specifying the type of fault selected from stack terminal short circuits, low side short circuits, and high side short circuits.

More preferably, the information comprises identification information identifying at least one individual faulty fuel injector when the type of fault identified is either a stack terminal short circuit or a low side short circuit.

In one embodiment, where a high side short circuit has been identified, the device provides additional information regarding whether the short circuit is a short circuit to ground or a short circuit to battery.

The inventive concept encompasses a computer program product comprising at least one computer program software portion which, when executed in an executing environment, is operable to implement the methods described above. The inventive concept also encompasses a data storage medium having the or each computer software portion stored thereon, and a microcomputer provided with said data storage medium.

BRIEF DESCRIPTION OF THE DRAWINGS

Reference has already been made to FIG. 1 by way of technical background to the present invention.

Figure 1:
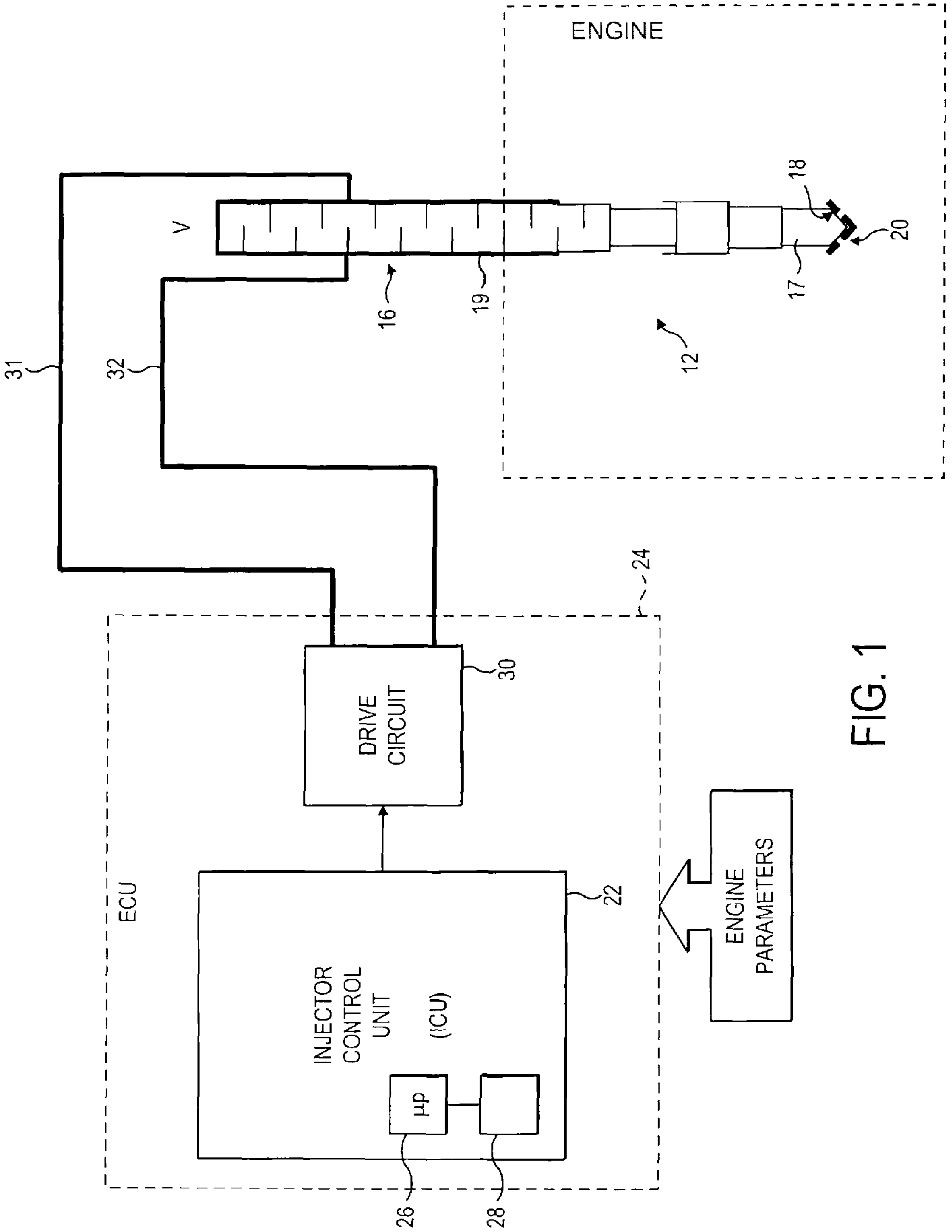
FIG. 1 is a schematic representation of a piezoelectric injector and its associated control system comprising an injector drive circuit.
Figure 2A:
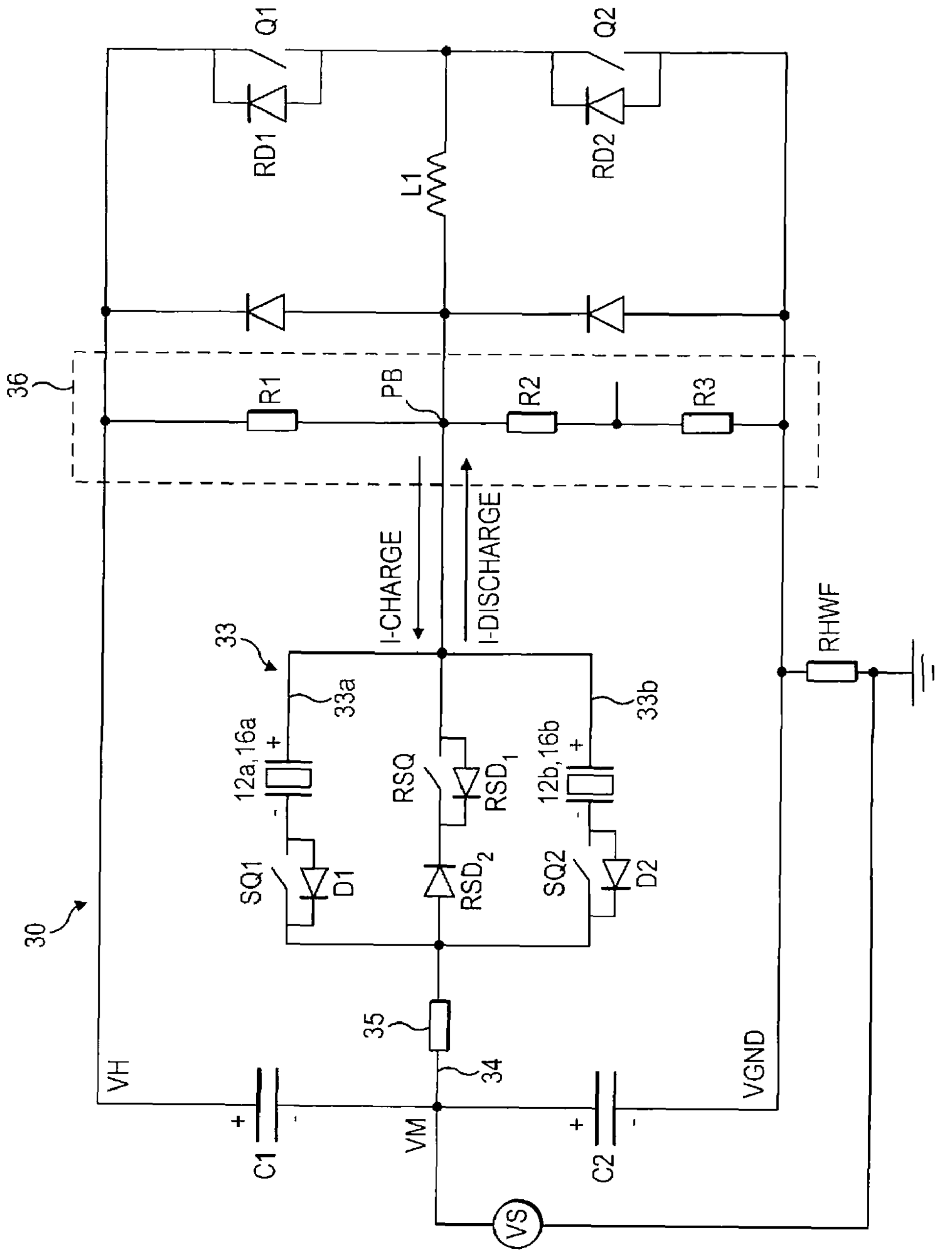
Figure 2B:
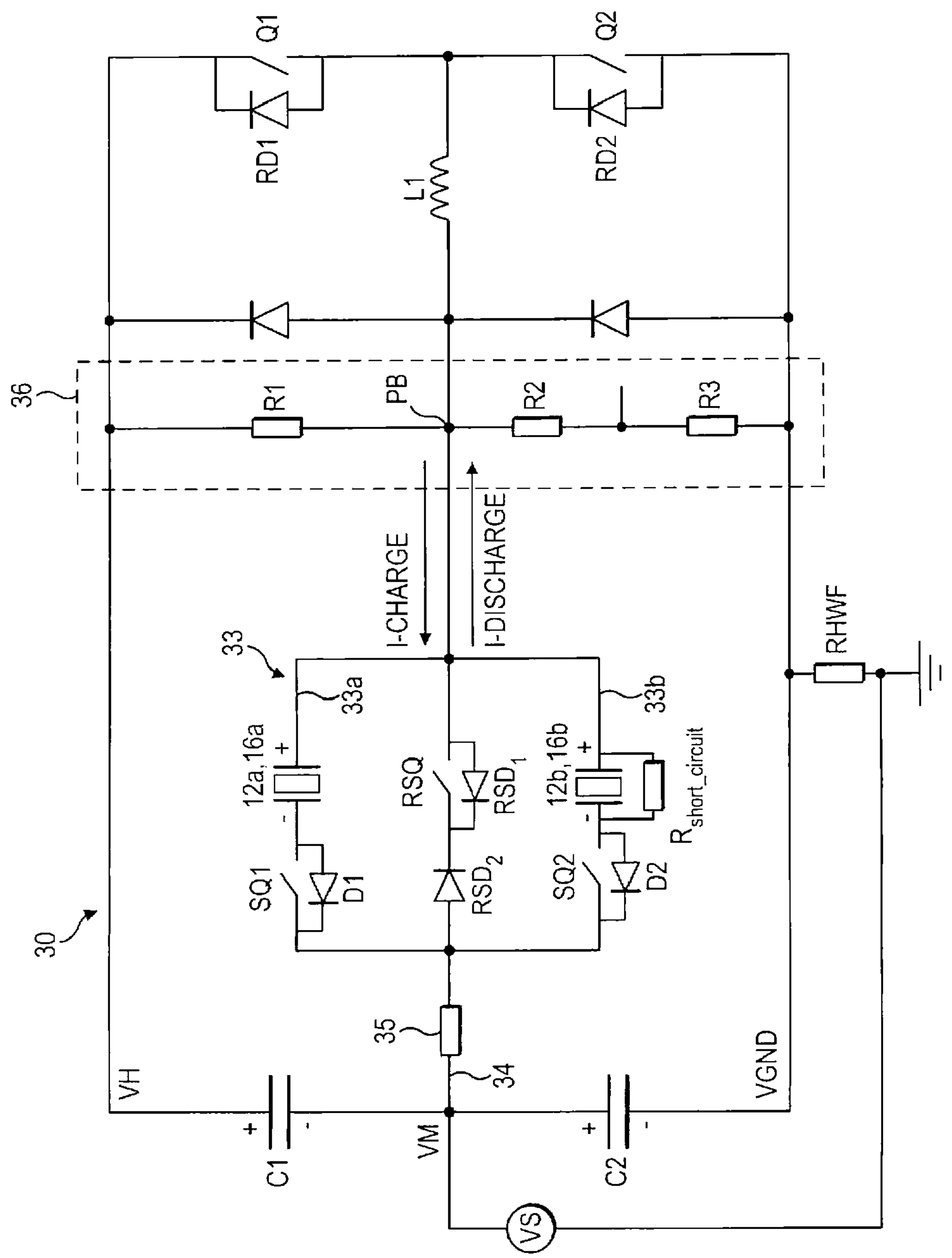
Figure 3:
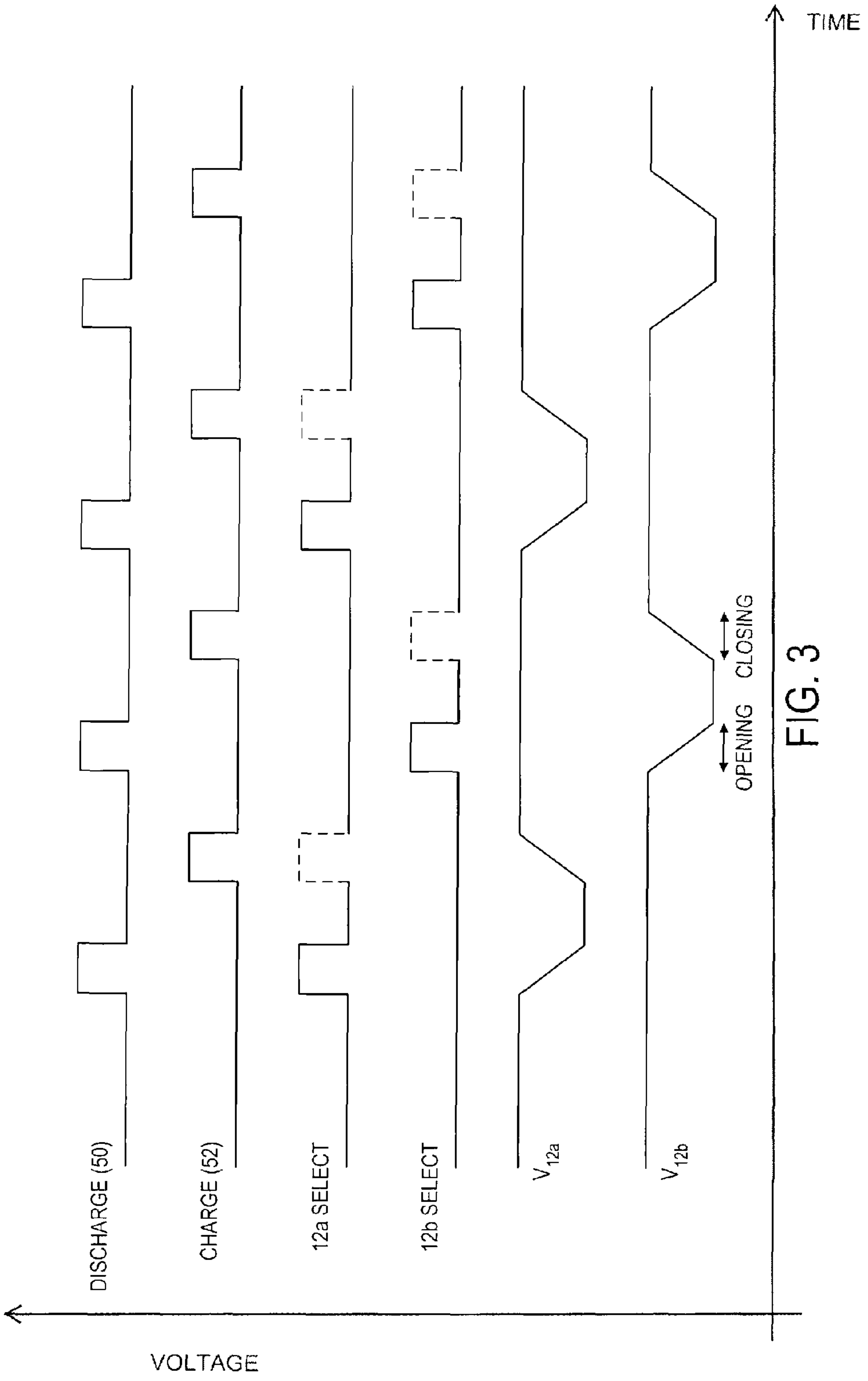
Figure 4:
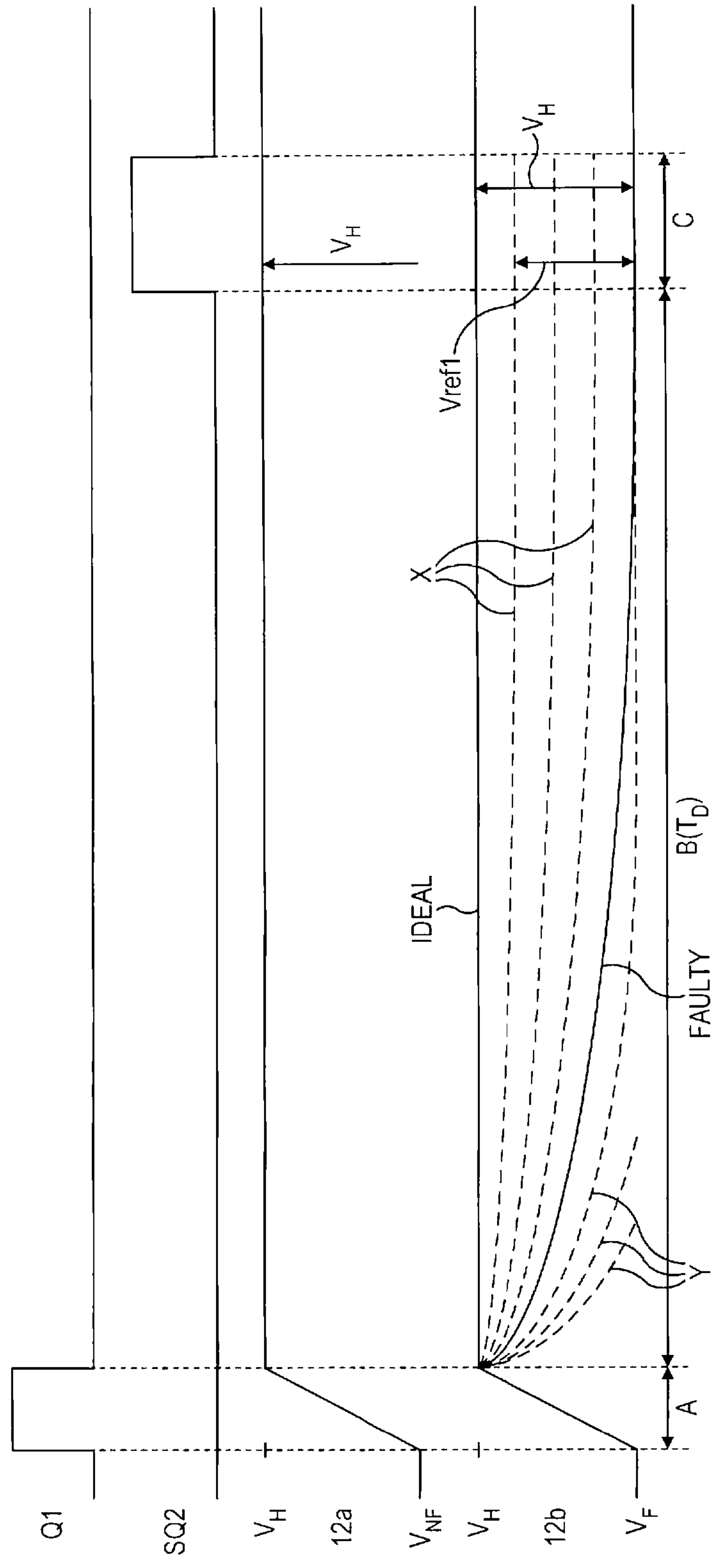
Figure 5:
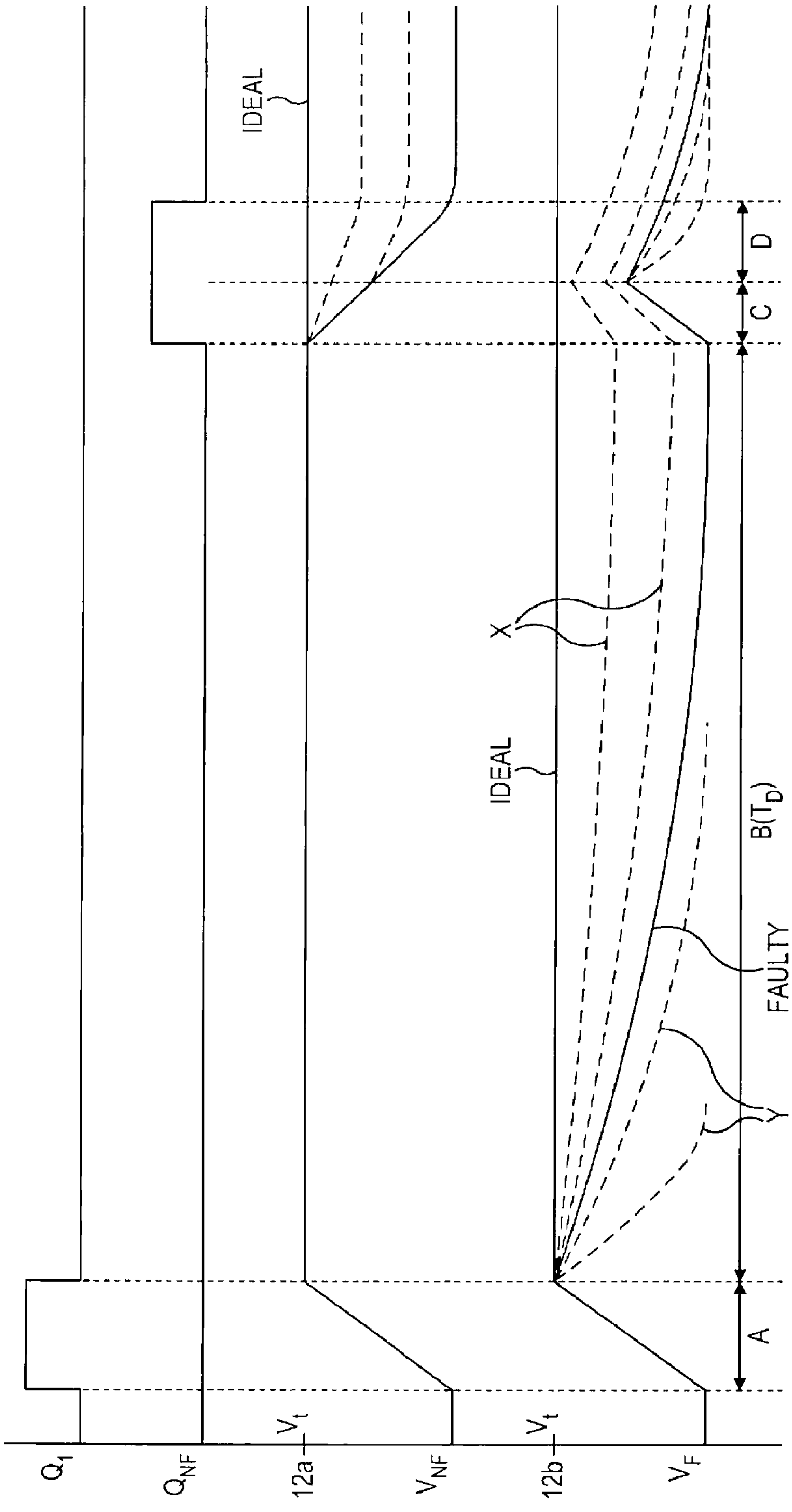
Figure 6:
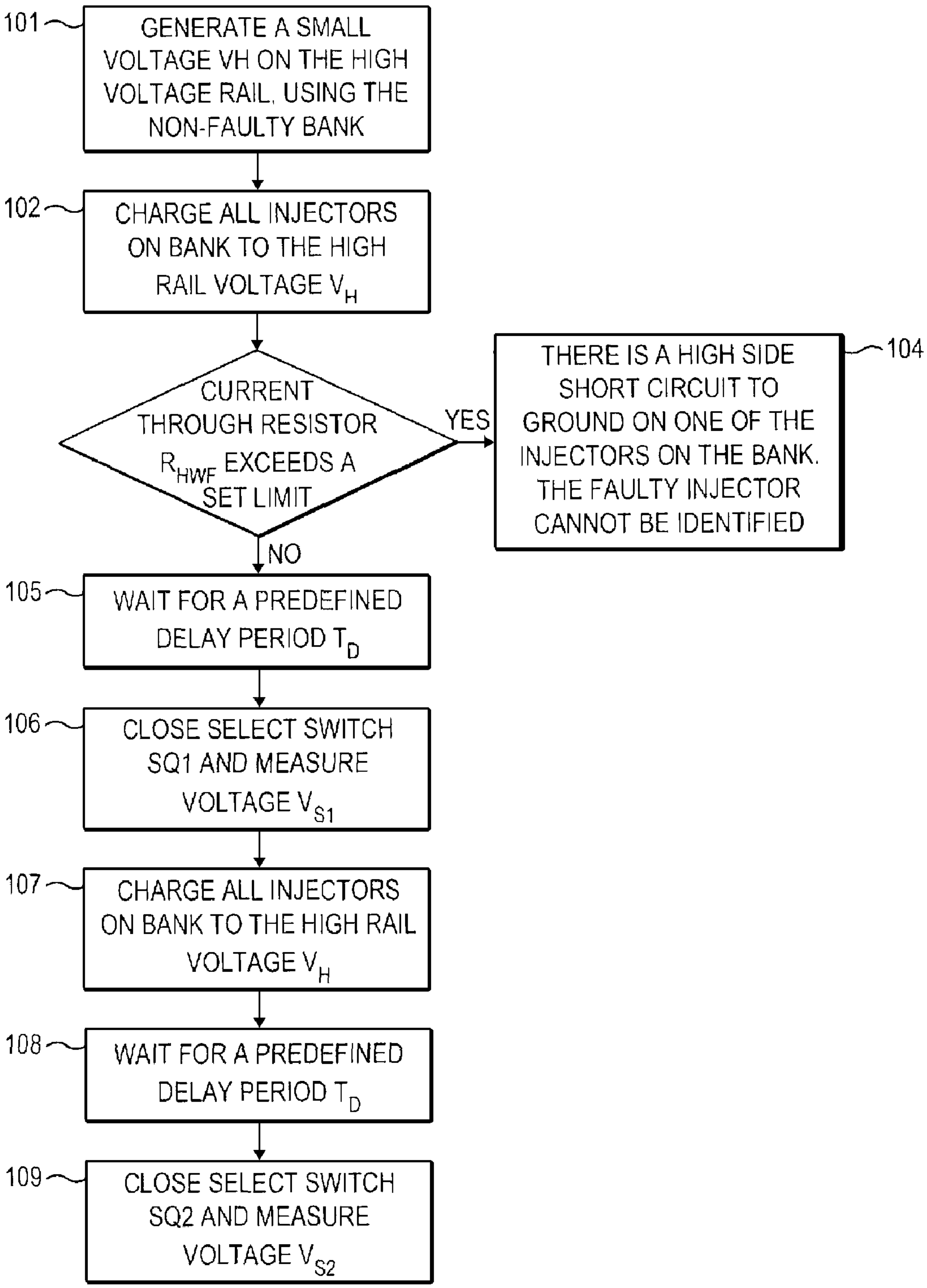
Figure 7:
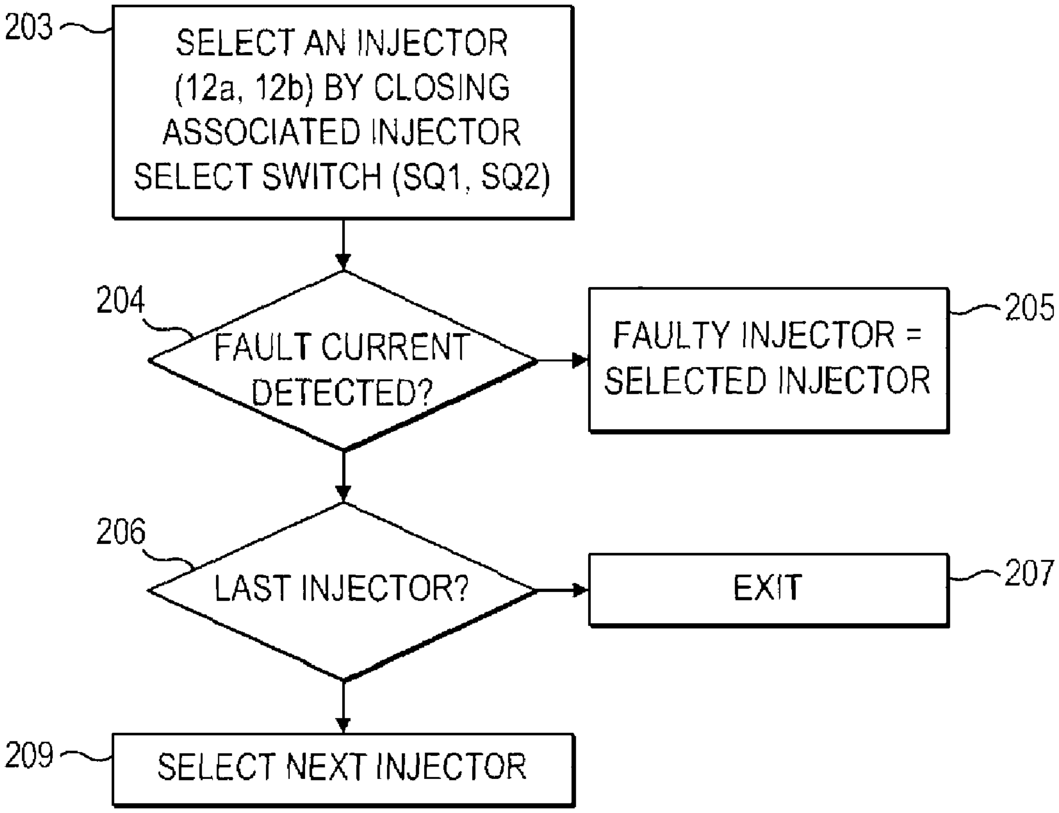
Figure 8:
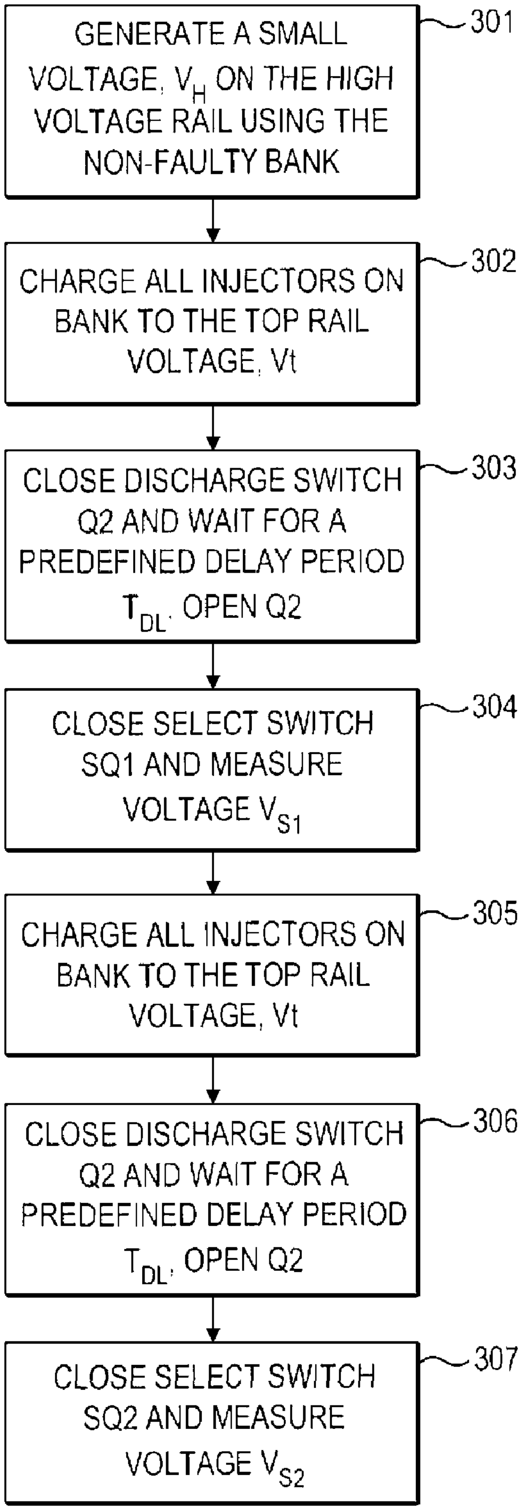

In order that it may be more readily understood, the present invention will now be described with reference to the following figures, in which:

FIG. 2*a* is a schematic circuit diagram of the injector drive circuit in FIG. 1, according to an embodiment of the present invention;

FIG. 2*b* is the schematic circuit diagram of FIG. 2*a* showing a stack terminal short circuit on one of the injectors;

FIG. 3 is a graph of ideal voltage waveforms, and charge, discharge and injector select signals, for two injectors;

FIG. 4 is a graph of voltage waveforms for two injectors when one injector has a stack terminal short circuit, showing the effect of different short circuit resistances, when the faulty injector is selected during a time period C;

FIG. 5 is a graph of voltage waveforms for two injectors when one injector has a stack terminal short circuit, showing the effect of different short circuit resistances, when the non-faulty injector is selected during time periods C and D;

FIG. 6 is a flow diagram of method steps of a diagnostic routine, according to one aspect of the present invention, for identifying individual faulty injectors with stack terminal short circuits;

FIG. 7 is a flow diagram of method steps of a diagnostic routine, according to one aspect of the present invention, for identifying individual faulty injectors with low side to ground short circuits; and FIG. 8 is a flowchart of method steps of an alternative diagnostic routine, according to one aspect of the present invention, for identifying individual faulty injectors with low side to ground short circuits.

DETAILED DESCRIPTION OF THE PREFERRED EMBODIMENTS

Referring to FIG. 2*a*, this shows an injector drive circuit 30 according to the present invention. The injector drive circuit 30 comprises an injector bank circuit 33, in which a pair of piezoelectric injectors 12*a*, 12*b* are connected. It should be appreciated that although the respective injectors 12*a*, 12*b* are shown as integral to the injector bank circuit 33 in FIG. 2*a*, in practice the injector bank circuit 33 would be remote from the injectors 12*a*, 12*b* and connected thereto by way of power supply leads.

The drive circuit 30 includes three voltage rails: a high voltage rail VH (typically 255 V), a mid voltage rail VM (typically 55 V), and a ground voltage rail VGND (i.e. 0 V). The drive circuit 30 is generally configured as a half H-bridge with the mid voltage rail VM serving as a bi-directional middle current path 34. The injector bank circuit 33 is located in the middle current path 34 of the drive circuit 30 and comprises a pair of parallel branches 33*a*, 33*b* in which the piezoelectric actuators 16*a*, 16*b* (hereinafter referred to simply as 'actuators') of the injectors 12*a*, 12*b* are respectively connected. The injector bank circuit 33 further comprises a pair of injector select switches SQ1, SQ2 connected in series with the respective injectors 12*a*, 12*b* in the respective branches 33*a*, 33*b* of the injector bank circuit 33. Each injector select switch SQ1, SQ2 has a respective diode D1, D2 connected across it. The injector bank circuit 33 is located between, and coupled in series with, an inductor L1 and a current sensing and control means 35.

The injector bank includes a regeneration branch in parallel with the actuators 16*a*, 16*b*. The regeneration branch includes a regeneration switch RSQ, a first diode $RSD_1$ connected across the regeneration switch RSQ and a second diode $RSD_2$ connected in series with the regeneration switch RSQ. The first and second diodes $RSD_1$, $RSD_2$ are opposed to one another so that current can only flow one way through the regeneration branch, and then only when the regeneration switch RSQ is closed.

A voltage source VS is connected between the mid voltage rail VM and the ground rail VGND of the drive circuit 30. The voltage source VS may be provided by the vehicle battery (not shown) in conjunction with a step-up transformer (not shown), or other suitable power supply, for increasing the voltage from the battery to the required voltage of the mid voltage rail VM.

A first energy storage capacitor C1 is connected between the high and mid voltage rails VH, VM, and a second energy storage capacitor C2 is connected between the mid and ground voltage rails VM, VGND. The first capacitor C1, when fully charged, has a potential difference of about 200 volts across it, whilst the potential difference across the second capacitor C2 is maintained at about 55 volts. A charge switch Q1 is located between the high and mid voltage rails VH, VM, and a discharge switch Q2 is located between the mid voltage and ground rails VM, VGND.

In essence, the drive circuit 30 comprises a charge circuit and a discharge circuit. The charge circuit comprises the high and mid voltage rails VH, VM, the first capacitor C1 and the charge switch Q1, whereas the discharge circuit comprises the mid and ground rails VM, VGND, the second capacitor C2 and the discharge switch Q2. The charge switch Q1 is operable to connect the injectors 12*a*, 12*b* to the first capacitor C1 causing a current to flow in the charge circuit, in the direction of the arrow 'I-CHARGE', to charge the actuators 16*a*, 16*b* to a known voltage. The diodes D1, D2 connected across the injector select switches SQ1, SQ2 allow the injectors 12*a*, 12*b* to charge in parallel when the charge switch Q1 is closed. To initiate an injection event from a selected injector 12*a* or 12*b*, a current is caused to flow in the discharge circuit, in the direction of the arrow 'I-DISCHARGE'. This is achieved by closing both the discharge switch Q2 and an injector select switch SQ1, SQ2 to connect the selected injector 12*a* or 12*b* to the second capacitor C2.

Energy is replenished to the capacitors C1, C2 during a regeneration phase so that the capacitors C1, C2 are ready for use in further charge and discharge phases. To commence the regeneration phase, the regeneration switch RSQ and the discharge switch Q2 are closed whilst the charge switch Q1 remains open. Current from the vehicle battery (not shown) flows around the discharge circuit to charge the second capacitor C2. The discharge switch Q2 is then opened, and because of the inductance of the inductor L1, some current continues to flow through the middle current path 34 for a short while after the discharge switch Q2 is opened. This current flows through the diode RD1 connected across the charge switch Q1 and into the positive terminal of the first capacitor C1 to partially charge the first capacitor C1. The discharge switch Q2 is repeatedly closed and opened to further charge the first capacitor C1 until the potential difference across the first capacitor C1 is increased to about 255 volts during normal operation of the drive circuit. The regeneration process is described in more detail in WO 2005/028836A1.

FIG. 3 shows waveforms of the non-faulty injectors 12*a* and 12*b*, their associated injector select switches SQ1 and SQ2, and the switch signals 50, 52 for the charge and discharge switches Q1 and Q2, respectively.

As shown, when the discharge signal 50 changes from low to high, the selected injector discharges, i.e. the voltage across the injector reduces, until the discharge signal 50 changes back from high to low. Similarly, when the charge signal 52 changes from low to high, the selected injector charges, i.e. the voltage across the injector rises, until the charge signal 52 changes back from high to low.

In an alternative embodiment, the injectors may be charged without selecting their respective select switches SQ1 and SQ2 because the diodes D1 and D2 allow current to flow through both injectors 12*a*, 12*b* so as to charge in parallel, provided the charge switch Q1 is closed. The dashed-line sections in FIG. 3 show the injector select switch waveforms corresponding to these alternative embodiments.

As the name suggests, in 'discharge to inject' injector arrangements, fuel injection commences during an opening phase, as the injector discharges, and fuel injection ceases during a closing phase when the injector charges.

The drive circuit 30 further includes a resistive bias network 36 connected between the high voltage rail VH and ground rail VGND, and intersecting the middle circuit branch 34 at a bias point PB. The restive bias network 36 is used to determine the voltage VB at the bias point PB in order to detect short circuit faults on the injectors 12*a*, 12*b*.

The resistive bias network 36 includes first, second and third resistors R1, R2, R3 connected together in series. The first resistor R1 is connected between the high voltage rail VH and the bias point PB, and the second and third resistors R2 and R3 are connected in series between the bias point PB and the ground rail VGND. The first, second and third resistors R1, R2, R3 each have a known resistance of a high order of magnitude, typically of the order of hundreds of kilo-ohms. For convenience, R1, R2 and R3 are used herein to refer to both the resistors and to the resistances of the resistors R1, R2, R3.

A current detection resistor $R_{HWF}$, for detecting certain types of short circuits in the injector arrangement, is connected between the ground rail VGND and ground. The current detection resistor $R_{HWF}$ is of very low resistance, of the order of milliohms, and hence the voltage on the ground rail VGND is substantially zero volts.

If one of the injectors has a short circuit across its terminals, the piezoelectric stack of the faulty injector retains a capacitive element in parallel with the short circuit resistance $R_{short\_circuit}$, as shown in FIG. 2*b*. If so, then the faulty injector will not hold its charge following a charge event on the bank 33. Instead, the injector 12*a*, 12*b* will discharge through the stack terminal short circuit at a rate governed by the inherent resistance of the stack terminal short circuit. The effect of different inherent resistances can be seen in FIGS. 4 and 5.

A method of the present invention is employed to detect a stack terminal short circuit. The method involves determining the voltage VB at the bias point PB with an injector 12*a* or 12*b* selected, i.e. with an injector select switch SQ1 or SQ2 closed. When an injector select switch SQ1 or SQ2 is closed, the voltage VB measured at the bias point PB is related to the voltage on the selected injector 12*a* or 12*b*. Therefore, knowing the mid voltage rail is at 55V enables the voltage on the selected injector (12*a* or 12*b*) to be obtained by subtracting the voltage on the mid voltage rail VM (55V in this example) from the voltage VB at the bias point PB.

The voltage measurement is performed after a predetermined period following a charge event on the bank 33. The voltage on an injector 12*a*, 12*b* at the end of a charge event is known. If the voltage VB at the bias point PB is less than a predetermined voltage level, then this is indicative of a stack terminal short circuit on one or both of the injectors 12*a*, 12*b*. It should be appreciated that the expression 'voltage on an injector' is used for convenience and refers to the voltage across the piezoelectric stack of the injector actuator 16*a*, 16*b*.

As described above, a disadvantage of using the selected voltage reading to determine stack terminal short circuits on the injectors 12*a*, 12*b* is that this technique can entail a charge share between the injectors 12*a*, 12*b* in the event of a stack terminal fault. Charge sharing occurs when a non-faulty injector 12*a*, 12*b* is selected causing it to discharge into a faulty injector 12*a*, 12*b*.

For example, referring to FIG. 2*b*, if the second injector 12*b* has a stack terminal short circuit, then selecting the first injector 12*a* by closing the first injector select switch SQ1 will result in a closed loop in the injector bank circuit 33. The closed loop includes the diode D2 connected across the second injector select switch SQ2, and the closed first injector select switch SQ1. An uncontrolled current will flow from the non-faulty first injector 12*a*, and around the closed loop to charge the discharged faulty second injector 12*b*, in turn resulting in the non-faulty first injector 12*a* discharging. Charge sharing can also occur if one of the injectors 12*a*, 12*b* has a stack terminal short circuit, when an injector 12*a* or 12*b* is selected for discharge by closing the associated injector select switch SQ1 or SQ2. Whilst the selected voltage reading technique is able to determine stack terminal short circuit faults on the injector bank 33, charge sharing prevents this technique from being able to determine which of the individual injectors 12*a*, 12*b* is faulty.

An alternative diagnostic technique for detecting stack terminal faults is a so-called 'charge pulse' technique, as described in EP 06256140.2 and EP 07252534.8. The charge pulse technique comprises performing a first 'charge pulse' on the injectors 12*a* and 12*b* by closing the charge switch Q1 for a short period of time; opening the charge switch Q1 and allowing a predetermined period of time to elapse before closing the charge switch Q1 again for another short period of time to perform a second charge pulse on the injectors 12*a*, 12*b*. If either of the injectors 12*a*, 12*b* has a stack terminal short circuit, then it will discharge to an extent during the predetermined period prior to the second charge pulse being performed. Hence, when the second charge pulse is performed, a current will flow in the charge circuit to recharge the discharged faulty injector 12*a* or 12*b*.

If neither of the injectors 12*a*, 12*b* has a stack terminal short circuit, then both injectors 12*a*, 12*b* should hold substantially all their charge during the predetermined period prior to the second charge pulse being performed, in which case substantially no current will flow in the charge circuit when the second charge pulse is performed. The current sensing and control means 35 is arranged to monitor current flow during the second charge pulse. The presence of a current during the second charge pulse above a predetermined threshold current level is indicative of a stack terminal short circuit on one or both of the injectors 12*a*, 12*b* on the bank 33. The predetermined threshold current level is based on a minimum acceptable resistance of stack terminal short circuit and the duration of the predetermined period prior to the second charge pulse being performed.

Whilst the charge pulse technique described above does not suffer from the charge share problems of the selected voltage reading technique (because both injector select switches SQ1, SQ2 remain open), in common with the other diagnostic techniques described above, the charge pulse technique is also not able to determine which of the individual injectors 12*a*, 12*b* is at fault, only that there is a fault on one of them.

Either of the above techniques may be used at appropriate times, during normal operation of the drive circuit or at engine start-up, to determine whether there is a stack terminal short circuit. In practice, the ECU 24 has many diagnostic techniques which may individually or in combination be capable of detecting when an injector is short circuit. When a short circuit is discovered, steps are taken to isolate the injector bank so as to prevent further damage to the engine or actuators and also to prevent the engine running in an unacceptable manner in terms of fuel delivery or emissions.

Upon discovering that there is a short circuit fault on one of the injectors, the ECU 24, may output a signal which causes a warning light or display to show that a fault has been detected and the vehicle should be taken for servicing.

For the reasons described above, even if a short circuit fault is identified on an injector bank, it is not currently possible to identify which injector of the bank is faulty. The present invention resides in an additional diagnosis technique for determining which injector is faulty, such that the faulty injector is easily identified for replacement. This is advantageous since previously, when it was not possible to determine this information simply using a diagnostic technique or routine, additional time-consuming tests had to be performed later during service in order to identify which injector was faulty. Worse still, if it was not possible to determine which injector on the bank was faulty, all of the injectors on that bank had to be replaced.

Stack terminal short circuits of suitably high resistance may not be detrimental to the normal operation of the system. Therefore, only short circuits of a certain resistance or lower are required to be detected. The level of short circuit resistance chosen is that at which the injector is deemed to no longer meet the requirements in terms of fuel delivery and/or emissions targets. The level of short circuit resistance is hereinafter referred to as the threshold resistance $R_{TH}$. Short circuit resistances below this threshold value indicate faulty injectors which need to be replaced at the next vehicle service.

The relationship between the short circuit resistance, stack capacitance, stack voltage and time may be modelled in order to calibrate the following diagnosis technique such that it is possible to detect the presence of stack terminal short circuits of resistance equal to or lower than the threshold resistance $R_{TH}$.

The relationship can be modelled on the basis of the following equation:

$$I = C\frac{dV}{dt}$$

The following technique relies on being able to select the injectors to determine the voltage on their respective stacks. However, as discussed above, this inherently means that the charge on a non-faulty injector(s) will be shared with the faulty injector, making it difficult to accurately detect the faulty injector and also carrying the risk that an uncontrolled injection could occur. Other risks include unacceptable fuel delivery, or failure to meet emission requirements. The inventors of the present invention have appreciated that due to the relationship between short circuit resistance, stack capacitance, stack voltage and time given in the above equation, certain restrictions may be placed on the conditions under which the additional diagnosis routine may be carried out in order to mitigate the risk associated with charge share.

The stack capacitance varies under certain operating conditions, for example, stack temperature, however, the capacitance can be determined from look-up tables on the basis of the operating conditions.

As detailed above, there is a requirement to be able to detect short circuit resistances equal to or lower than the threshold resistance $R_{TH}$. It is possible to set the values of top rail voltage Vt, the threshold resistance $R_{TH}$ and the time before the stack voltage is read $t_D$, such that for a short circuit of resistance $R_{TH}$ or less, the voltage measured on the stacks of both of the injectors is indicative of which injector is faulty. By setting Vt, $R_{TH}$ and $t_D$ it is possible to mitigate the above problems associated with charge share.

FIG. 4 shows the voltage across two injectors 12$a$, 12$b$. During time period A the charge switch Q1 is closed and both injectors are charged to the top rail voltage Vt (approximately 20V). During time period B, all of the switches are open, and both injectors should retain their charge, as shown by the lines labelled 'ideal'. However, a faulty injector with a stack terminal short circuit will discharge through its short circuit resistance, as shown by the line labelled 'faulty' in FIG. 4.

In order to measure the voltage across the injector, one of the injectors (in this case the faulty injector 12$b$) is selected at the end of the delay period $t_D$ by closing select switch SQ2. The injector remains selected during time period C.

The voltage on the faulty injector decreases at a rate dependent on the inherent resistance of the stack terminal short circuit. Different discharge rates are represented by the dashed lines X and Y in FIG. 4. If the short circuit resistance is below the threshold resistance $R_{TH}$, the stack will discharge at a faster rate as shown by dashed lines Y. As such, the voltage across the terminals measured during time period C is substantially zero since the faulty injector has already discharged during time period B, i.e. during $t_D$. However, if the short circuit resistance is higher than the threshold resistance $R_{TH}$, the stack will discharge at a slower rate as shown by dashed lines X. Therefore, there will still be a voltage present across the stack terminals when the faulty injector is selected during time period C, as shown at Vref1.

Since the non-faulty injector is also charged during time period A, it will retain its charge because the non-faulty injector is not selected at this time and because, during time period C, the voltage on the non-faulty injector is substantially VH. However, when the non-faulty injector is selected by closing its select switch, a closed circuit loop is set up and the non-faulty injector discharges itself into the faulty injector. FIG. 5 shows the voltage waveforms when the non-faulty injector is selected.

As shown in FIG. 5, during time period A the charge switch Q1 is again closed and both injectors are charged to the top rail voltage Vt. Similarly, during time period B, the faulty injector, with a short circuit resistance approximately equal to the threshold resistance $R_{TH}$, again discharges through its short circuit resistance, as shown by the line labelled 'faulty'. Dashed lines X show the voltage waveforms for short circuit resistances which are above the threshold resistance $R_{TH}$, and dashed lines Y show the voltage waveforms for short circuit resistances which are below the threshold resistance $R_{TH}$.

During time period C the non-faulty injector 12$a$ is selected by closing its select switch SQ1. However, this results in the charge present on the non-faulty injector being shared with the faulty injector because, when selected, the non-faulty injector is placed in a closed circuit loop with the faulty injector. This results in a current flowing through the non-faulty injector causing the non-faulty injector to discharge, as shown during time period C of FIG. 5. The current also flows through the faulty injector with the result that the faulty injector becomes charged. However, during time period D the faulty injector continues to discharge as before, again due to the short circuit across its terminals.

As shown in FIG. 5, different values of short circuit resistance (as shown by dashed lines X and Y) cause different discharge rates. If a faulty injector has fully discharged by the end of delay period $t_D$ (i.e. the lines marked "faulty" and "Y"), the extent of the short circuit is largely irrelevant during the initial charge share, (i.e. during period C). Therefore, for short circuit resistances for which a full discharge has occurred by the end of the delay period $t_D$, the charge rate would be the same for those short circuit resistances.

If a full discharge has not occurred by the end of the delay period $t_D$, the injector will start to charge up again during period C depending on the rate of discharge of the non-faulty injector. In all cases the charge lost from the non-faulty injector is substantially equal to the charge gained on the faulty injector. After the select switch is opened at the end of period D, the faulty injector, if not already fully discharged, will continue to discharge, whilst the non-faulty injector will maintain its voltage.

In one embodiment, the above diagnostic technique may be achieved by calibrating Vt and $t_D$ to ensure that the voltage across the faulty injector, at the end of the period $t_D$, is substantially zero for short circuit resistances equal to or lower than the threshold resistance. In other words, given that the stack capacitance is known or can be determined from look-up tables on the basis of certain operating conditions, and for a short circuit resistance lower than the threshold resistance $R_{TH}$, if the injectors are charged to Vt initially, the voltage across the selected injector should be substantially zero volts by the end of period $t_D$. Similarly, for a short circuit resistance higher than the threshold resistance $R_{TH}$, the voltage across the selected injector will be greater than zero volts.

In another embodiment, it may be sufficient to identify when the voltage across the injector is below a predetermined voltage level, or where the amount of discharge from the top rail voltage Vt exceeds a predetermined amount, i.e. where the voltage measured across the injector with respect to the top rail voltage Vt (in other words the 'voltage drop') exceeds a predetermined voltage drop limit.

If a non-faulty injector 12*a* is selected and the voltage across it is determined on the basis of the voltage at the bias point VB and the voltage on the mid voltage rail VM, there will be a charge share to the faulty injector, and the non-faulty injector will discharge to substantially zero volts. If the voltage on the selected (non-faulty) injector is read very shortly after the select switch is closed, a detectable voltage is still present on the injector, and the presence of this voltage is used to indicate that it is the non-faulty injector that has been selected: the non-selected injector being the faulty one.

The above relationship between the short circuit resistance, stack capacitance, stack voltage and time may be modelled and a suitable look-up table generated. This look-up table will provide different values for Vt and $t_D$ depending on different operating conditions, and depending on the resolution required. Vt must be chosen to ensure that, allowing for the resolution/accuracy of voltage measurement, it is possible to distinguish between faulty and non-faulty injectors. However, it is important to keep Vt as low as possible to minimise the charge share between the injectors.

The values for Vt and $t_D$ are to be selected to ensure that at the end of $t_D$, the faulty injector has discharged to substantially zero volts. By determining the voltage on each of the injectors at the end of the period $t_D$ (i.e. which injector is at zero volts and which injector still has a voltage on it) it is possible to determine which injector is short circuit, and which is not. This can be shown with reference to FIGS. 4 and 5, where $V_{NF}$ represents the voltage on 12*a* at the end of $t_D$, and $V_F$ represents the voltage on 12*b* at the end of $t_D$. Depending on whether the short circuit resistance is greater or lower than the threshold resistance determines whether it is possible to identify the faulty injector.

In order to identify the faulty injector it is necessary to determine the voltage on both the injectors, and to compare the amount of discharge or voltage drop on each injector against the predetermined voltage drop limit, which is representative of the threshold at which the amount of discharge is significant enough to warrant detection. The term 'voltage drop' in this sense relates to the voltage measured across the injectors (i.e. the voltage measured at bias point VB minus the mid rail voltage VM) in relation to the voltage to which the injectors where charged (i.e. the top rail voltage Vt).

The predetermined voltage drop limit may be determined on the basis of the threshold resistance $R_{TH}$, which it is desirable to detect, and a delay period $t_D$ of suitable length (i.e. $t_D$ must not be too long in order to keep the test time to a minimum, in light of the numerous tests to be performed), and also in relation to the top rail voltage Vt. However, because it is only possible to measure the voltage on an injector when its select switch is closed it is necessary for at least two charge cycles to be completed in order to gain enough information to identify the faulty injector. The number of charge cycles required depends on the number of injectors in the injector bank, since there needs to be a charge cycle for each injector in the injector bank being tested. In the following example there are two injectors and, therefore, two charge cycles.

It is important to calibrate the timing of the voltage measurement correctly since there may be variations in the amount of time it takes for the injector select switch to close. It is to be appreciated that waiting too long to measure the voltage across the non-faulty injector may result in a measurement below the predetermined voltage drop limit, which would give an incorrect indication that the selected injector (while actually being the non-faulty injector) was the faulty injector. It is also important to calibrate the predetermined voltage drop limit correctly for the same reason, i.e. if the predetermined voltage drop limit is set incorrectly this diagnosis technique may give inaccurate results.

In an illustrative example, a first injector 12*a* is not faulty and a second injector is faulty, and during a first charge cycle, both injectors are charged up to the top rail voltage Vt. If the first injector 12*a* is selected at the end of the delay period $t_D$ following the first charge cycle, then, because of the short circuit across the faulty second injector, there will be charge share between the injectors and the voltage across the non-faulty injector will reduce accordingly. However, with careful calibration of the timing of the measurement of the voltage across the selected (non-faulty) injector, it is possible to measure the voltage shortly after the injector is selected such that the voltage across that injector is greater than the predetermined voltage drop limit. In other words because the non-faulty injector is selected there is still a sufficient voltage across that injector at the time the voltage is measured in order to indicate it is not the faulty injector. In the case where other diagnostic routines have found the presence of a stack terminal short circuit, and when there are only two injectors on the selected bank, it is possible to identify the non-selected injector (i.e. the second injector) as being faulty.

However, because there is a charge cycle per injector, measuring the voltage across the previously unselected injector will confirm the above finding. During the second charge cycle, both injectors 12*a* and 12*b* are again charged up to the top rail voltage Vt. At the end of the delay period $t_D$, the second injector 12*b* will have been fully discharged provided the delay period has been selected to detect short circuits at or below the threshold resistance $R_{TH}$. As such, the amount of discharge or voltage drop measured exceeds the voltage drop limit, indicating that the faulty injector has been selected.

Of course, it is possible that the faulty injector could have been selected during the first charge cycle, which would provide an indication that it is the faulty one. However, the diagnostic tool must be capable of reading both injectors so as to cover the scenario when the faulty injector is not that which is first selected.

In addition, where the short circuit resistance is above the threshold resistance it may not be possible to determine which is the faulty injector since in practice, the voltages measured for both injectors (i.e. the determined voltage drop for each injector) may not exceed the predetermined voltage drop limit.

Furthermore, as explained above if there is too long a delay between selecting a non-faulty injector and measuring the voltage across that injector, it is possible that because of the charge share the measured voltage drop is greater than the predetermined voltage drop limit, indicating the selected injector is faulty when it is not.

However, with careful calibration of the predetermined voltage drop limit, and because of the differences in the measured levels of discharge or voltage drop, it is possible to detect which injector is faulty. It is to be appreciated that the threshold resistance, and as such the predetermined voltage drop limit, must be selected carefully to be able to distinguish between short circuits that may not be detrimental to the normal operation of the system, and at the same time provide accurate results.

The method steps of operation of a diagnostic technique of the present invention, which is used to identify which injector is faulty, in the manner described above, are shown in FIG. 6.

Either the selected voltage technique, the charge pulse technique or an alternative technique is used to detect the presence of a short circuit on one of the injectors of a first injector bank. This may be during normal operation of the drive circuit, or during dedicated test routines which are performed at engine start-up.

When it is found that one of the injectors is faulty the relevant injector bank is isolated such that the faulty injector is taken out of action, until further tests may be performed. A visual indicator may be provided to alert the driver to a problem such that they may arrange for the vehicle to be serviced.

The following diagnostic routine is typically performed during servicing of the vehicle in order to identify or verify the faulty injector prior to replacement. However, the following additional diagnostic test may also be performed at engine switch-on when other diagnostic routines are also run to improve control at engine start up.

A small voltage Vt is generated, at step 101, on the high voltage rail VH. This small voltage may be generated using the non-faulty bank since the regeneration phase of the non-faulty bank can be controlled to generate a suitably small voltage rather than the approximate 255V that is generated for normal use.

The charge switch Q1 (of the bank with the faulty injector) is closed, at step 102, causing all of the injectors to be charged to the high rail voltage Vt.

The processor determines, at step 103, whether there is a high side short circuit to ground or battery. In the case where there is a high side short circuit to ground or battery, a current that exceeds an acceptable limit will be detected through this resistor $R_{HWF}$, during the charge phase i.e. the short circuit is above a certain resistance. If a current that exceeds the acceptable limit is detected then a high side short circuit is confirmed, at step 104. Unfortunately, in this case, it is not possible to determine which injector is the faulty injector since the high sides of the injectors in this bank arrangement are common. In other words, a high side short circuit of a certain resistance or lower effectively creates a current path which bypasses the injectors.

In the case where a high side short circuit is found it is also possible to distinguish between high side to ground and high side to battery short circuits. This is achieved by measuring the voltage at bias point VB when none of the injectors are selected. The bias voltage measured for a high side to ground short circuit will be within a first set of limits, and the bias voltage measured for a high side to battery short circuit will fall within another set of limits. As such it is possible to distinguish between short circuits to ground and short circuits to battery.

If a high side short circuit is determined, the diagnostic routine for this bank ends at step 104, and the bank is isolated.

If the current through $R_{HWF}$ does not exceed the acceptable limit, the diagnostic routine waits, at step 105, for a predefined delay period $t_D$. The select switch for one of the injectors e.g. SQ1 is closed, at step 106, and a voltage $V_{S1}$ (measured at bias point VB corresponding to the voltage on injector 12*a*) is read and stored in memory.

Again, the charge switch Q1 is closed, at step 107, causing all of the injectors on the bank to be charged to the high rail voltage Vt. The diagnostic routine waits again, at step 108, for a predefined delay period $t_D$. The select switch for the other injector e.g. SQ2 is closed, at step 109, and a voltage $V_{S2}$ (measured at bias point VB corresponding to the voltage on injector 12*b*) is read and stored in memory.

The above process is repeated accordingly depending on the number of injectors present in the injector bank.

The diagnostic routine compares, at step 109, the measured voltages $V_{S1}$ and $V_{S2}$. In one embodiment, whichever of the measured voltages $V_{S1}$ and $V_{S2}$ is substantially 0 V indicates that the corresponding injector is the faulty injector. In another embodiment, the faulty injector is identified by comparing the amount of discharge or voltage drop with respect to Vt and identifying when the measured voltage drop exceeds the predetermined voltage drop limit.

If it is determined that neither $V_{S1}$ and $V_{S2}$ are substantially 0V, or that the amount of discharge or voltage drop does not exceed the limit, then the short circuit resistance must be greater than the threshold resistance and the short circuit on the injector is not of low enough resistance to be detrimental to the operation of the drive circuit. As such the injector may not need to be replaced.

As detailed above, another type of short circuit is a low side to ground or battery short circuit. If one of the injectors 12*a*, 12*b* has a low side short circuit a further method, referred to as a "fault current detection diagnostic technique" is used to identify the faulty injector.

When the select switch of the faulty injector is closed, a fault current is detected by the current control and sensing means 35 and/or through $R_{HWF}$. A fault current, detected in either of these current sensors/resistors at a time when the faulty injector is selected, indicates that that the selected injector is the faulty injector. Therefore, by closing each select switch in turn, the faulty injector can be identified.

The current control and sensing means 35 and $R_{HWF}$ are current detection devices, and could be any suitable current detection device. The current control and sensing means 35 is typically a 'chop feedback mechanism' that outputs a control signal to the processor when the current though the sensing means reaches a target value. For the purpose of fault current detection, the target current value is set to a predicted level corresponding to the resistance of short circuit faults which are to be detected.

The method steps relating to the above method of detecting low side to ground short circuits in the manner described above are shown in FIG. 7.

A first injector 12*a* is selected, at step 203, by closing the appropriate select switch SQ1.

The processor determines, at step 204, whether a fault current is present, and if so determines, at step 205, that the faulty injector is the selected injector.

The bias voltage technique described above may then be used to determine whether the fault is to ground or battery. As before, the voltage at the bias point VB is measured, and if it falls within one set of limits, the short circuit is a low side to ground short circuit, or if the voltage measured falls within another set of limits, the short circuit is a low side to battery short circuit.

If no fault current is detected, the first injector is de-selected. The processor determines, at step 206, whether the selected injector is the last injector and if it is, exits the routine, at step 207.

The next injector, 12*b*, is selected, at step 209, by closing the appropriate select switch SQ2.

The processor again determines, at step 204 whether a fault current is present, and if so determines, at step 205, that the faulty injector is the selected injector. Steps 204 to 209 are repeated until all of the injectors have been selected and tested for low side short circuits.

It is also possible to use a variation of the above fault current detection diagnostic technique to assist in distinguishing high side to ground short circuits from high side to battery short circuits.

Rather than selecting an injector, at step 203, the regeneration switch is closed. In this technique, a fault current flowing is indicative of a high side short circuit. Again, the bias voltage technique described above may then be used to determine whether the fault is to ground or battery. As before, the voltage at the bias point VB is measured, and if it falls within one set of limits, the short circuit is a high side to ground short circuit, or if the voltage measured falls within another set of limits, the short circuit is a high side to battery short circuit.

The information relating to which injector is faulty may be stored and retrieved during vehicle servicing to indicate which injector needs to be replaced.

The above method may not provide a sufficient degree of sensitivity to detect low side short circuits if the fault current is not high enough to be detected by the current sensing means 35 or via $R_{HWF}$. As such, an alternative method is shown in FIG. 8.

This alternative method relies on the fact that the injector with the low side to ground short circuit will discharge when the discharge switch is selected. When the discharge switch is selected, a closed loop circuit, comprising the low side short circuit resistance, the faulty injector, the inductor and the discharge switch Q2, is created. It is expected that the faulty injector will discharge during a delay period $t_{DL}$ depending on the resistance of the low side short circuit. Again, certain short circuit resistances may not have a detrimental effect on operation of the drive circuit, and the following diagnostic routine is concerned with identifying short circuit resistances which are below a threshold resistance value.

Using a similar method to that of FIG. 6, it is possible to detect which of the injectors has a low side short circuit.

As before, a small voltage Vt is generated, at step 301, on the high voltage rail VH.

The charge switch Q1 (of the bank with the faulty injector) is closed, at step 302, causing all of the injectors to be charged to the high rail voltage Vt.

The discharge switch Q2 is closed, at step 303, and the processor waits for a predefined delay period $t_{DL}$. The discharge switch Q2 is then opened.

The select switch for the first injector SQ1 is closed, at step 304, and the voltage $V_{S1}$ on 12*a* is read and stored in memory.

The charge switch Q1 (of the bank with the faulty injector) is closed again, at step 305, causing all of the injectors to be charged to the high rail voltage Vt again.

The discharge switch Q2 is closed again, at step 306, and the processor waits for the predefined delay period $t_{DL}$. The discharge switch Q2 is again opened.

The select switch for the second injector SQ2 is closed, at step 307, and the voltage $V_{S2}$ on 12*b* is read and stored in memory.

The diagnostic routine compares the measured voltages $V_{S1}$ and $V_{S2}$. In one embodiment, whichever of the measured voltages $V_{S1}$ and $V_{S2}$ is substantially 0V indicates the faulty injector. In another embodiment, the faulty injector is identified by comparing the amount of discharge or voltage drop with respect to Vt and identifying when the measured voltage drop exceeds the predetermined voltage drop limit.

If it is determined that neither $V_{S1}$ and $V_{S2}$ are substantially 0V or that the amount of discharge or voltage drop do not exceed the predetermined voltage drop limit, then the low side short circuit resistance must be greater than the threshold resistance and the low side short circuit is not sufficiently low enough to be detrimental to the operation of the drive circuit. As such the injector may not need to be replaced.

It is important to calibrate $t_{DL}$ carefully in the same way as mentioned above for the method of FIG. 6. In fact, $t_{DL}$ is likely to be different to $t_D$ because the discharge circuit including the inductor, which results from a low side to ground short circuit, has a different discharge characteristic than the discharge circuit that results from a stack terminal short circuit which includes the stack capacitance of the faulty injector.

The above voltage measurement technique may also be modified to assist in distinguishing between high side to ground short circuits and high side to battery short circuits.

As before, a small voltage Vt is generated, at step 301, on the high voltage rail VH.

The charge switch Q1 (of the bank with the faulty injector) is closed, at step 302, causing all of the injectors to be charged to the high rail voltage Vt.

However, this time an injector is selected throughout a delay period $t_{DHS}$. It does not matter which injector is selected since the high sides of each injector are common. At the end of the delay period $t_{DHS}$, the voltage across the selected injector is measured in order to determine the voltage drop. If the voltage drop exceeds the predetermined voltage drop limit, a high side fault is confirmed. Again, the bias voltage technique may be used to distinguish high side to ground short circuits from high side to battery short circuits.

Again, it is important to calibrate $t_{DHS}$ carefully in the same way as mentioned above for the method of FIG. 6, since there is a risk of reverse-biasing the injectors.

Conventional diagnostic routines are executed by the ECU 24 during start-up or during normal operation in order detect various faults, including short circuits. As such, the ECU 24 provides at least one fault signal to indicate the type of fault. As described above, using these conventional diagnosis routines, it is not possible to detect which injector is actually faulty. The above described techniques of the present invention may be executed, after the above conventional diagnostic routines, during engine servicing with the aid of a service tool connected to the ECU 24. A fault signal, generated by the ECU 24, may be transmitted to the service tool so an engineer can determine additional information (including which injector is faulty) such that the necessary action may be taken.

The invention claimed is:

1. A method of identifying an individual short circuited fuel injector within an injector bank of an engine comprising a plurality of fuel injectors each having a piezoelectric actuator and an associated injector select switch forming part of an injector drive circuit, the method comprising the steps of:

(i.) charging all of the piezoelectric actuators of the plurality of fuel injectors within the injector bank during a charge phase by applying a top rail voltage to a high voltage rail of said drive circuit;

(ii.) at the end of the charge phase waiting for a delay period;

(iii.) subsequently closing an injector select switch of a fuel injector to select said fuel injector during the charge phase such that the stack voltage of each piezoelectric actuator increases to a voltage approaching the top rail voltage;

(iv.) determining a stack voltage present across the piezoelectric actuator of the selected fuel injector and storing the stack voltage in a data store, wherein the stack voltage is indicative of an amount of charge present on the selected injector at the end of the delay period;

(v.) repeating steps (i) to (iv) for each fuel injector in the injector bank in turn;

identifying an individual short circuited fuel injector as being the injector which has discharged beyond a predetermined voltage drop limit during the delay period; and generating a short circuit fault signal for the identified fuel injector.

2. The method of claim 1, wherein the identifying step comprises identifying the individual short circuit fuel injector as being the injector with a stack voltage of substantially zero volts.

3. The method of claim 1, wherein the short circuit fault signal is a stack terminal short circuit fault signal.

4. The method of claim 1, wherein the step of charging all of the piezoelectric actuators comprises:

applying a top rail voltage to a high voltage rail of the drive circuit; and closing a charge switch of the drive circuit during the charge phase such that the stack voltage of each piezoelectric actuator is caused to increase to a voltage at or approaching the top rail voltage, and wherein the top rail voltage and the delay period are derived on the basis of a threshold short circuit resistance, so as to identify an individual short circuit injector which has a short circuit resistance equal to or less than the threshold short circuit resistance.

5. The method of claim 4, wherein the threshold short circuit resistance is dependent on the type of fault being identified.

6. The method of claim 1, wherein the step of identifying the individual short circuit fuel injector comprises determining whether the short circuit is either a low side to ground short circuit or a low side to battery short circuit, and the generated low side short circuit fault signal is either a low side to ground short circuit fault signal or a low side to battery short circuit fault signal, respectively.

7. A method of identifying an individual short circuit fuel injector within an injector bank of an engine comprising a plurality of fuel injectors each having a piezoelectric actuator and an associated injector select switch, and the method comprising:

(i.) closing an associated injector select switch of a fuel injector to select said injector;

(ii.) determining whether a fault current flows through a current detection means in connection with the selected injector as a result of a low side to ground or battery short and exceeds a threshold current value which is dependent upon the inherent resistance of the low side to ground short circuit;

(iii.) repeating steps (i) and (ii) for each one of the plurality of fuel injectors by selecting their associated injector select switch;

(iv.) identifying the short circuit fuel injector as being the injector that causes a fault current to flow through the current detection means; and (v.) generating a low side short circuit fault signal for the identified fuel injector.

8. The method of claim 7, wherein the fault current is a current that flows as a result of a low side to ground or battery short circuit and exceeds a threshold current value which is dependent on the inherent resistance of the low side to ground short circuit.

9. The method of claim 7, further comprising:

measuring voltage level at a bias point VB when no injector is selected;

determining whether:

a) the measured voltage is within a first set of limits which are indicative of the short circuit being a low side to ground short circuit; or b) the measured voltage is within a second set of limits which are indicative of the short circuit being a low side to battery short circuit; and wherein the step of generating a low side short circuit fault signal for the identified fuel injector comprises generating an appropriate low side to ground or battery short circuit fault signal.

10. A method of testing for the presence of high side to ground short circuits within an injector bank of an engine comprising a plurality of fuel injectors each having a piezoelectric actuator and an associated injector select switch forming part of an injector drive circuit, and the method comprising:

(i.) monitoring the current through a current detecting resistor of the drive circuit;

(ii.) determining whether the monitored current exceeds a pre-determined current limit;

and then, if the monitored current does exceed said pre-determined current limit generating a high side short circuit fault signal for the injector bank, and then, if the monitored current does not exceed said pre-determined current limit, (iii.) charging all of the piezoelectric actuators of the plurality of fuel injectors within the injector bank during a charge phase by applying a top rail voltage to a high voltage rail of said drive circuit;

at the end of the charge phase waiting for a delay period;

subsequently closing an injector select switch of a fuel injector to select said fuel injector such that the stack voltage of each piezoelectric actuator increases to a voltage approaching the top rail voltage;

(iv.) determining a stack voltage present across the piezoelectric actuator of the selected fuel injector and storing the stack voltage in a data store, wherein the stack voltage is indicative of an amount of charge present on the selected injector at the end of the delay period;

(v.) repeating steps (i) to (iv) for each fuel injector in the injector bank in turn;

identifying the individual short circuit fuel injector as being the injector which has discharged beyond a pre-determined voltage drop limit during the delay period; and generating a short circuit fault signal for the identified fuel injector.

11. The method of claim 10, further comprising:

closing an injector select switch prior to monitoring the current through the current detecting resistor, wherein the monitored current exceeding the pre-determined current limit is indicative of the high side short circuit fault.

12. The method of claim 10, further comprising:

closing a regeneration switch prior to monitoring the current through the current detecting resistor, wherein the monitored current exceeding the pre-determined current limit is indicative of the high side short circuit fault.

13. The method of claim 10, further comprising:

measuring voltage level at a bias point VB when no injector is selected;

determining whether:

a) the measured voltage is within a first set of limits which are indicative of the short circuit being a high side to ground short circuit; or b) the measured voltage is within a second set of limits which are indicative of the short circuit being a high side to battery short circuit; and wherein the step of generating a high side short circuit fault signal comprises generating an appropriate high side to ground or battery short circuit fault signal.

* * * * *